No. 725,202. PATENTED APR. 14, 1903.
L. W. BATES.
METHOD OF FORMING NAVIGABLE CHANNELS.
APPLICATION FILED JULY 19, 1900.
NO MODEL. 3 SHEETS—SHEET 1.
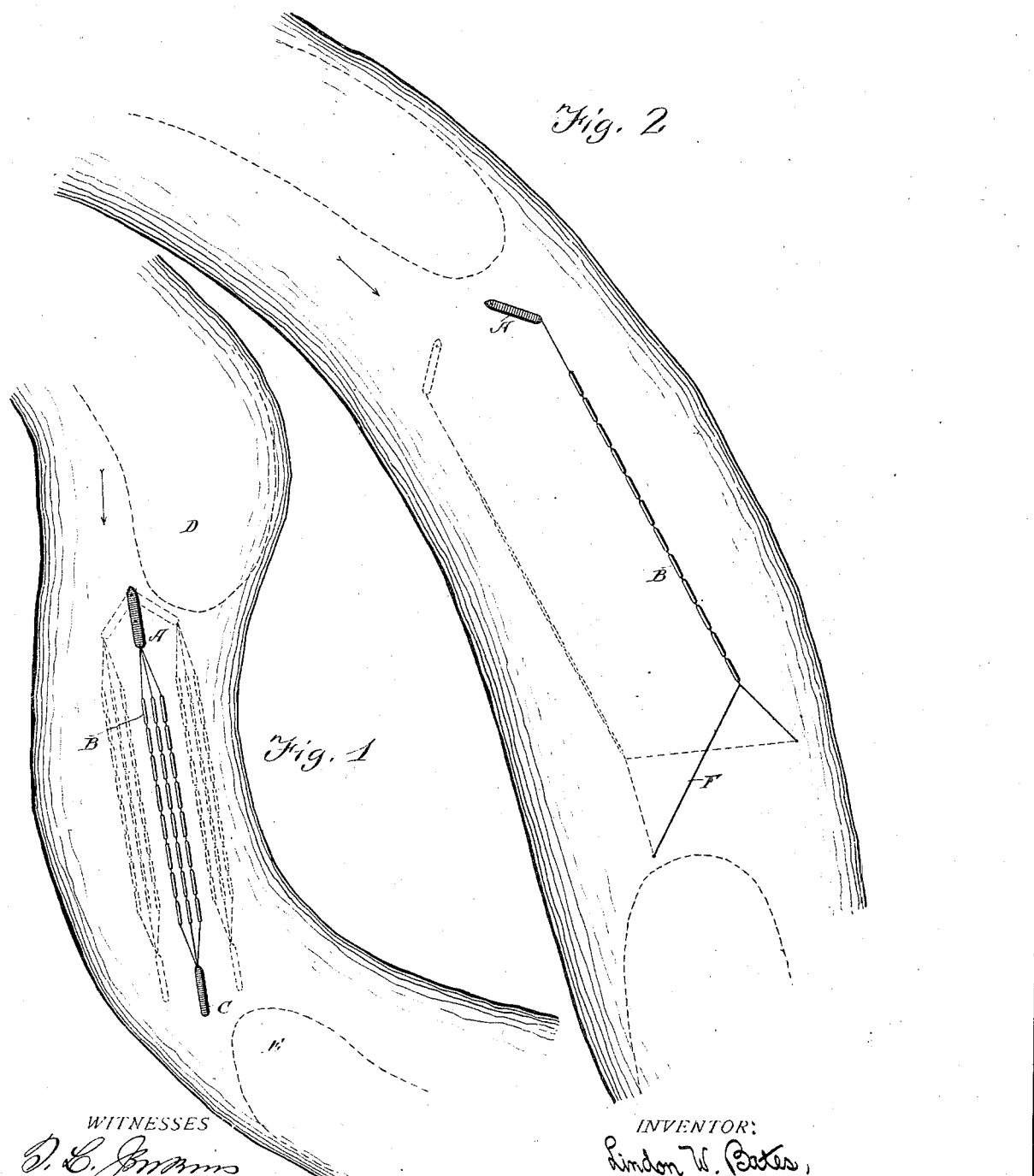

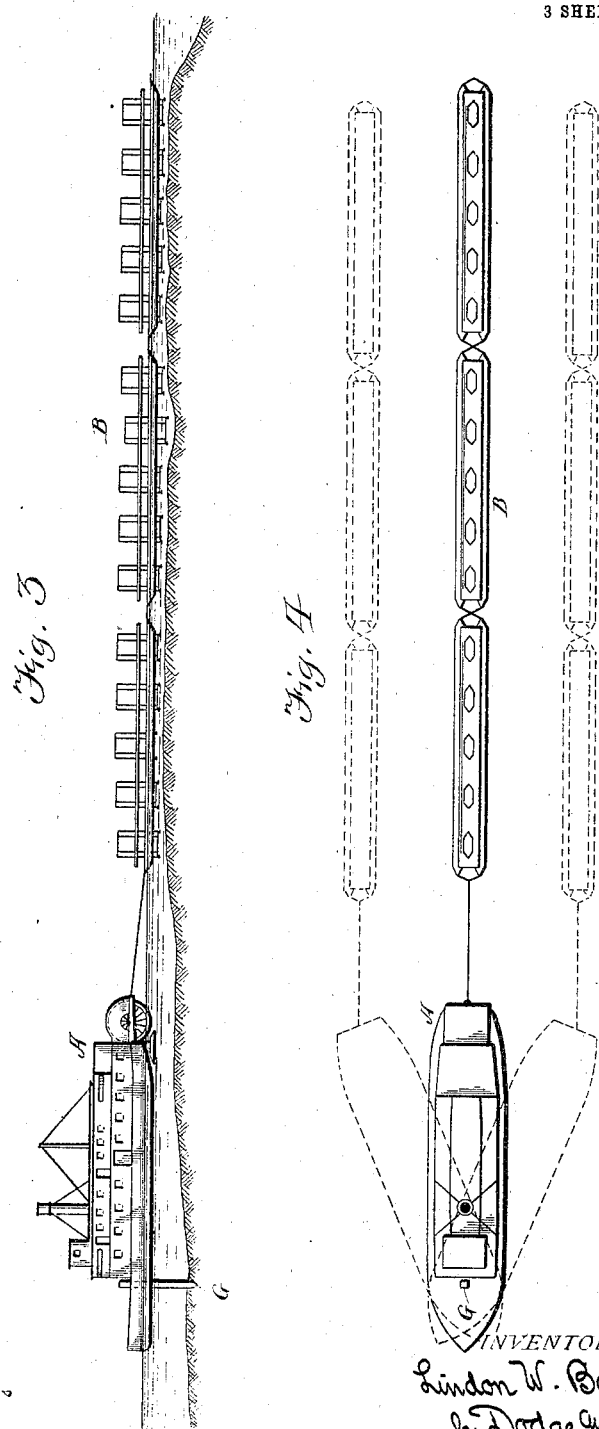

No. 725,202. PATENTED APR. 14, 1903.
L. W. BATES.
METHOD OF FORMING NAVIGABLE CHANNELS.
APPLICATION FILED JULY 19, 1900.
NO MODEL. 3 SHEETS—SHEET 3.
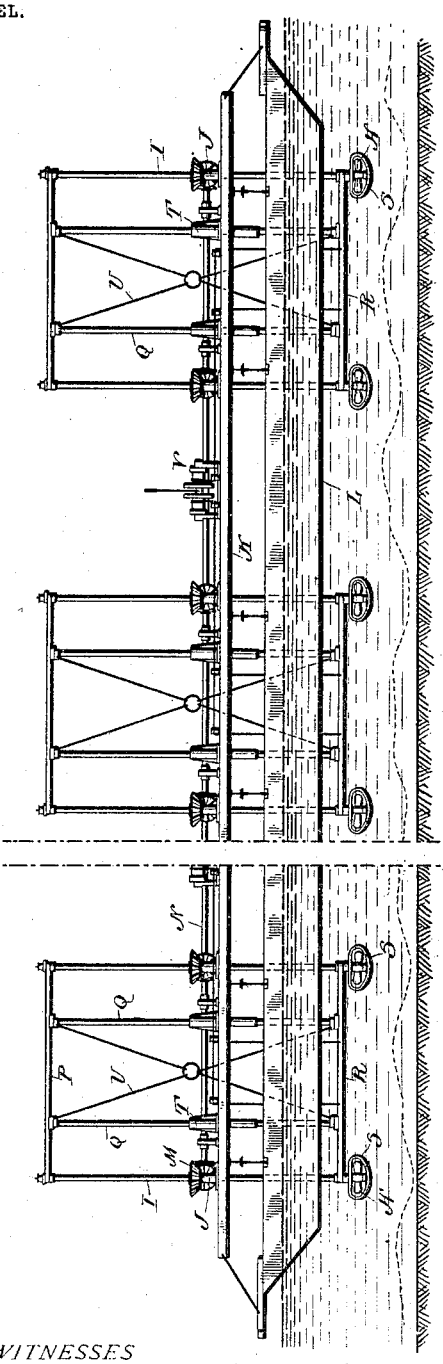
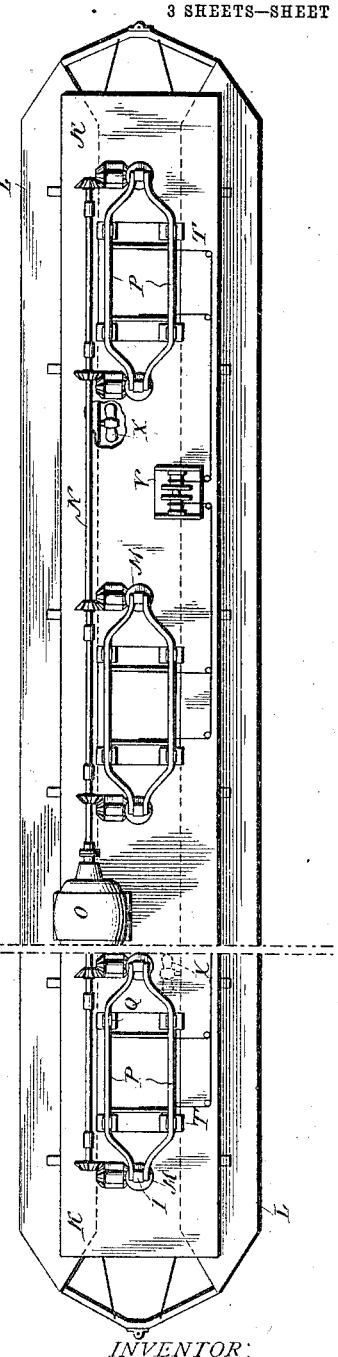

UNITED STATES PATENT OFFICE.

LINDON WALLACE BATES, OF CHICAGO, ILLINOIS.

METHOD OF FORMING NAVIGABLE CHANNELS.

SPECIFICATION forming part of Letters Patent No. 725,202, dated April 14, 1903.

Application filed July 19, 1900. Serial No. 24,248. (No model.)

*To all whom it may concern:*

Be it known that I, LINDON WALLACE BATES, a citizen of the United States, residing at Chicago, in the county of Cook and State of Illinois, have invented certain new and useful Improvements in Methods of Forming Navigable Channels, of which the following is a specification.

My present invention pertains to an improved method of forming navigable channels across river-bars and the like and will be best understood upon reference to the accompanying drawings, wherein—

Figure 1 is a plan view illustrating the use of one form of apparatus or plant employed in carrying out my invention; Fig. 2, a similar view showing another form of apparatus or plant; Fig. 3, a side elevation of the apparatus, showing its relation to a bar which it is desired to remove; Fig. 4, a top plan view showing the different relative positions in which the apparatus may be placed; Fig. 5, an enlarged side elevation of one of the pontoon-sections, and Fig. 6 a top plan view of the same.

The object of my invention is to provide a process or method of rapidly forming navigable channels across river-bars and this at a less cost than can be done by dredging or other methods of deepening now in use.

The invention is more especially applicable for use on crossover-bars—that is to say, bars formed at the bends of a river. By eroding the bar or deposit and at the same time agitating the water sufficiently to keep the eroded particles in suspension the transporting power of the river is assisted to a sufficient extent to enable it to carry off the material. The plant in general consists of a number of pontoons which are flexibly connected to one another, and a single, double, or multiple line of such pontoons may be employed. Each pontoon is provided with a number of contrivances for rapidly eroding the bottom of a river, these contrivances in all cases being so arranged that they may be raised or lowered to suit the depth of water. The upstream end of the line or lines, as the case may be, of pontoons is attached to a tug adapted for working in shallow water, and a second tug of similar description may be attached to the downstream end of the pontoon-line, or else this may be controlled by two lines leading to anchors.

In Fig. 1 there is illustrated a series of lines of flexibly-connected pontoons controlled by two tugs—one at each end of the line—while in Fig. 2 there is shown a single line of pontoons controlled by a tug at the upstream end and by anchor-lines at the opposite or downstream end. The line of pontoons is towed into position over the bar to be attacked, and the eroding apparatus is set in motion after having been adjusted on each pontoon to the depth of water occurring at that spot, as is best illustrated in Fig. 3. The mechanism on the upstream-tug then proceeds to move the pontoon fleet backward and forward a short distance—viz., about the distance from one pontoon to the other or pitch of the eroding apparatus on the pontoons. A narrow trench or channel is soon formed in the bar, the eroding agents being lowered during the process until the required depth is reached over the whole length of line. As soon as the eroding devices begin to form a channel the current sets in through said channel and assists the eroding agents in their action. When the required depth of channel has been reached, the tug moves the line of pontoons to either side, the upstream position being fixed by the width of channel it is intended to produce. During this operation the pontoon-line is kept taut by the downstream-tug or else by paying out and hauling in the controlling-lines, hereinbefore mentioned, from a suitable hoisting or warping engine. The material removed by erosion is also kept in suspension by the action of the eroding apparatus, and the agitation produced thereby is sufficient to allow the river to carry off said material into the deep pools which occur at the lower end of the bar.

It is manifest that the above description applies to a vertical-section eroding method. The method, however, may also be carried out by any apparatus designed to take off horizontal strata.

A great variety of eroding and agitating agents may be used, but for the purpose of a clear understanding of the present application one of these forms will be set forth.

Referring to Fig. 1 of the drawings, A denotes the upstream-tug, having secured to it a series of lines of flexibly-connected pontoons B, which in turn are attached to a downstream-tug C. The upstream-tug A is secured at the upper end of the bar near the deep pool D, while the downstream-tug C is in a position near deep pool E below the bar. Ordinarily these pools will be found adjacent a crossover-bar formed in the river.

In Fig. 2 the upstream-tug A is shown as having attached to it a single series of pontoons B, the lower or downstream end of which is connected to anchor-ropes F, which, as above stated, may be controlled by a suitable warping-engine. The upstream-tug A will preferably be held in its position by a spud G, which acts as a pivot therefor and permits the pontoon-lines to be thrown laterally across the bar, as is best indicated in Fig. 4, wherein three positions are shown.

Each pontoon-section has mounted upon it some form of agitating apparatus, and one of the many forms which may be used is shown in detail in Figs. 5 and 6. In the form illustrated the agitating and eroding device is shown as a series of propellers H. These propellers in the construction shown are carried upon the lower ends of vertically-disposed shafts I, which pass through boxes or bearings J, secured upon framework or flooring K, which in turn is carried between two horizontally-disposed pontoon members L. A bevel-gear M is feathered or otherwise held in operative relation with shaft I, and said gear is, through gearing such as shown connected to a line-shaft N, adapted to be driven by an electric motor O or other available source of power. Shaft O is designed to impart rotary motion to the various shafts I throughout the series mounted upon each pontoon. The vertically-disposed shafts I are preferably connected up in pairs to a suitable framework for properly supporting them and as affording means for raising and lowering the propellers to and from the bar upon which they are working. Said framework preferably consists of two cross members P, connected to the upper ends of the shafts, which in turn are rigidly connected through uprights Q to similar cross members R, which are attached to the lower ends of the shafts immediately above the propeller-guards S. The uprights Q pass through bearing blocks or members T, secured to the flooring or framework K. Cross-braces U may, if desired, be employed to stiffen the structure thus built up.

To provide means for raising and lowering the frames, suitable winches V are secured to the flooring K, and ropes or cables passing therefrom about suitable pulleys are connected to the frame; but it is of course to be understood that any means may be employed for raising and lowering the frames and that any means may be used for imparting motion to the propellers. The employment of an electric motor, however, is advantageous, as it may be readily controlled from aboard the tug.

Each pontoon-section is further fitted with two horizontal propellers X, one at each end, and placed so as to be just under water. These propellers may also be driven in any convenient manner, their object being to assist in keeping the line of pontoons straight when working on a bar and exposed to an oblique current. Any equivalent means, however, may be substituted for these.

The action of the apparatus thus described is as follows: The pontoons are brought over the bar and the frames carrying the propellers are lowered until the propellers are adjusted to the desired position over the bar. The line-shaft N is then thrown into action, imparting rotary motion to each of the propellers, which causes the water to act directly upon the material below, cutting it away and keeping the water in such a state of agitation that the material cannot again settle, but will be carried off by the current. As the material is eroded the propellers are lowered until the desired depth of cut is obtained. As soon as a channel is formed the current sets in therethrough and assists, as above noted, the apparatus in its action. When the cut has been made to the desired depth, the line of pontoons is shifted, so as to bring the propellers over a new part of the bar.

The apparatus herein set forth, as above pointed out, is to be taken simply as one of the many forms which may be employed for carrying out the method.

Water-jets issuing from the discharge-pipe of a centrifugal pump may be utilized for eroding the bar deposit or centrifugal pump-disks working under water may likewise be employed, as may be water-jets supplied from a pressure-main resting on the tug of the pontoon and connected to a suitable pump either on the pontoon or on the tug-boat.

Compressed air may be discharged against the bar deposit from suitable nozzles with the same effect as water-jets, the air-jets eroding the deposit and stirring up the water to such an extent that the loosened material is kept in suspension. Cutters or scrapers may also be employed, and these may be of any suitable shape for the particular substance to be dealt with—viz., crown-cutters, face-cutters, or milling-cutters, either solid or hollow. The eroding action of these cutters may be assisted and the material kept in suspension by combining therewith any of the water or air jet devices alluded to.

No claim is made in this case to the plant or apparatus herein described or in any manner referred to, as said plant, as well as the devices mentioned, forms the subject-matter of my copending application, Serial No. 24,249, filed on the 19th day of July, 1900.

Having thus described my invention, what I claim is—

1. The herein-described method of forming channels in river-bars and the like, which consists in eroding the material of the bar in a groove or channel extending across the entire length of the bar, and keeping the eroded material in suspension, whereby said material will be carried downstream through said groove or channel by the current of the river.

2. The herein-described method of forming channels in river-bars, which consists in eroding the material of the bar in a series of grooves or channels extending across the entire width of the bar, and keeping the said eroded material in suspension, whereby it may be acted upon and carried away by the river-current.

3. The herein-described method of forming channels in river-bars and the like, which consists in gradually eroding a relatively narrow groove or way in said bar throughout its length, and at the same time keeping said eroded material in suspension until the requisite depth is reached, whereby it may be acted upon and carried away by the river-current; and carrying forward said steps to one side of the groove thus formed until the desired width of channel is obtained.

4. The herein-described method of forming channels in river-bars and the like, which consists in eroding the material thereof in a groove or way extending entirely across the same, and agitating the water adjacent to the eroded material, whereby it will be carried away by the current set up in said groove and the groove further widened by the action of the current so brought about.

5. The herein-described method of forming channels in river-bars and the like, which consists in placing an eroding apparatus over the entire width of the bar to be removed, moving the eroding devices down as the bar is eroded; and at the same time traversing them back and forth in line with the channel being formed.

6. The herein-described method of forming channels in river-bars and the like, which consists in placing an eroding apparatus over the entire width of the bar to be removed, moving the eroding devices down as the bar is eroded, and at the same time traversing them back and forth in line with the channel being formed, and also laterally as the channel reaches the required depth.

In testimony whereof I have signed my name to this specification in the presence of two subscribing witnesses.

LINDON WALLACE BATES.

Witnesses:
PERCY E. MATTOCKS,
EDMUND S. SNEWIN.